(12) United States Patent
Dobin

(10) Patent No.: US 11,327,159 B2
(45) Date of Patent: May 10, 2022

(54) ELECTRONIC DISTANCE METER

(71) Applicant: Trimble AB, Danderyd (SE)

(72) Inventor: Rémi Dobin, Maison-Alfort (FR)

(73) Assignee: Trimble AB, Danderyd (SE)

( * ) Notice: Subject to any disclaimer, the term of this patent is extended or adjusted under 35 U.S.C. 154(b) by 747 days.

(21) Appl. No.: 16/197,857

(22) Filed: Nov. 21, 2018

(65) Prior Publication Data

US 2019/0154814 A1 May 23, 2019

(30) Foreign Application Priority Data

Nov. 23, 2017 (EP) ..................................... 17203417

(51) Int. Cl.
*G01S 17/10* (2020.01)
*G01S 7/4865* (2020.01)

(52) U.S. Cl.
CPC ............ *G01S 7/4865* (2013.01); *G01S 17/10* (2013.01)

(58) Field of Classification Search
None
See application file for complete search history.

(56) References Cited

U.S. PATENT DOCUMENTS

| 4,986,657 | A  | 1/1991  | Ohe |
| 8,085,387 | B2 | 12/2011 | Kludas et al. |
| 8,149,391 | B2 | 4/2012  | D'Aligny et al. |
| 8,368,875 | B2 | 2/2013  | Kludas et al. |
| 8,390,794 | B2 | 3/2013  | Kludas et al. |
| 8,514,376 | B2 | 8/2013  | D'Aligny et al. |
| 8,520,192 | B2 | 8/2013  | Goering |

(Continued)

FOREIGN PATENT DOCUMENTS

| EP | 0 022 747 A2 | 1/1981 | |
| EP | 0022747 A2 * | 1/1981 | ............. G01S 17/10 |

(Continued)

OTHER PUBLICATIONS

Extended European Search Report for Application No. 17 203 417.5, completed May 16, 2018, 6 pages.

*Primary Examiner* — Hovhannes Baghdasaryan
(74) *Attorney, Agent, or Firm* — Kilpatrick Townsend & Stockton LLP

(57) ABSTRACT

An electronic distance meter comprises a laser emitting a laser pulse toward a target, a photodetector adapted for receiving a laser pulse reflected by the target and for outputting a corresponding return pulse signal, and a comparison circuit receiving said return pulse signal and comprising a comparator provided with a first input and a second input and arranged to output a first fixed value signal when the signal at the first input exceeds the signal at the second input and else to output a second fixed value signal, said comparison circuit being arranged for determining a return pulse time signal based on the output of said comparator, said electronic distance meter being arranged for determining a target distance based on said return pulse time signal. The comparison circuit comprises a first branch connected to said first input and provided with an integrator which receives a signal derived from said return pulse signal and comprises an output connected to said first input, and a second branch connected to said second input which receives a signal derived from said return pulse signal.

15 Claims, 2 Drawing Sheets

(56) References Cited

U.S. PATENT DOCUMENTS

| | | |
|---|---|---|
| 8,605,955 B2 | 12/2013 | Petrescu et al. |
| 8,633,983 B2 | 1/2014 | Kludas et al. |
| 8,792,088 B2 | 7/2014 | Goering |
| 9,091,754 B2 | 7/2015 | d'Aligny |
| 9,157,989 B2 | 10/2015 | Gusev |
| 9,285,470 B2 | 3/2016 | Sanders et al. |
| 9,442,180 B2 | 9/2016 | Sanders et al. |
| 9,456,067 B2 | 9/2016 | Rudow et al. |
| 9,534,892 B2 | 1/2017 | Goering |
| 9,689,970 B2 | 6/2017 | d'Aligny |
| 10,073,165 B2 | 9/2018 | Nordenfelt et al. |
| 2016/0274224 A1 | 9/2016 | Nordenfelt et al. |
| 2017/0010357 A1 | 1/2017 | Lekas et al. |
| 2017/0285149 A1 | 10/2017 | Lekas et al. |

FOREIGN PATENT DOCUMENTS

| | | |
|---|---|---|
| EP | 0 778 472 A2 | 6/1997 |
| WO | 2017/042991 A1 | 3/2017 |

* cited by examiner

ELECTRONIC DISTANCE METER

CROSS-REFERENCE TO RELATED APPLICATIONS

The present application claims priority to European Patent Application No. EP17203417.5, filed Nov. 23, 2017, the entire contents of which are incorporated herein by reference for all purposes.

FIELD OF THE INVENTION

The invention concerns the field of range finding, and more particularly the field a laser-based electronics distance meters (EDM) dedicated to high precision Time Of Flight (TOF) measurement between two fine optical pulses.

BACKGROUND

Such EDMs include laser rangefinders (3D scanners, Total stations), handheld laser distance meters, LIDAR and others. Laser implemented in such devices, generally emits a short laser pulse called "start pulse" to enlighten a target. A part of that laser pulse is sent back by the target towards the device in the form of a short pulse called "stop pulse".

The time interval between the start and stop pulses provides with the distance between the device and the target. The start and stop pulses have to be converted efficiently into electrical pulses so that the time position information of each is not significantly degraded to reach the wanted precision. The start and stop electrical pulses are both processed in a front-end EDM dedicated to TOF measurement.

Several solutions have been developed in order to achieve the conversion of the start and stop pulses.

The first category of solutions is based on precise digital sampling of the pulses, using barycenter algorithm coded in a FPGA. However, achieving a millimeter precision requires determining the pulses times with a precision of the order of 10 picoseconds. This necessitates a fast ADC (Analog to Digital Converter), which makes this solution extremely unattractive in terms of cost.

The second category of solutions is based on a threshold comparison to provide for cheaper precise pulse time detection. More precisely, the pulse is fed into a comparator against a pulse threshold. When the pulse is below the threshold, the output value is at a first fixed value. When the pulse exceeds the threshold, the output is set to a second fixed value. The pulse time position can be identified as the transition moment from the first fixed value to the second fixed value. However, depending on the brightness of the pulse and on the background noise (both at the pulse level and the comparator level), there is an uncertainty in the pulse time detection which is known as time walk. The time walk of these solutions is incompatible with millimeter precision devices, and cannot be conveniently corrected by conventional feedback or compensation techniques. More precisely, for millimeter resolution devices, the typical pulse width is of the order of one nanosecond. This means that gigahertz clocks would be necessary for treatment, and rules out digital processing. Furthermore, time walk cannot be easily corrected based on available information.

There is thus a need for a submillimeter precision EDM working with short pulses (about 1ns), delivering walk time independent time position and luminance information, while remaining high speed, real time and cost effective.

SUMMARY

The invention improves the situation by providing an electronic distance meter comprising a laser emitting a laser pulse toward a target, a photodetector adapted for receiving a laser pulse reflected by the target and for outputting a corresponding return pulse signal, and a comparison circuit receiving said return pulse signal and comprising a comparator provided with a first input and a second input and arranged to output a first fixed value signal when the signal at the first input exceeds the signal at the second input and else to output a second fixed value signal, said comparison circuit being arranged for determining a return pulse time signal based on the output of said comparator, said telemeter being arranged for determining a target distance based on said return pulse time signal, wherein said comparison circuit comprises a first branch connected to said first input and provided with an integrator which receives a signal derived from said return pulse signal and comprises an output connected to said first input, and a second branch connected to said second input which receives a signal derived from said return pulse signal.

The Applicant has discovered that the cross-point between the pulse signal and its instantaneous integral is remarkably stable, fast and much less sensitive to signal level variations, background noise and comparator noise. As a result, it is now possible to provide an EDM which is both cost effective and highly precise in resolution with nanosecond pulses.

Various embodiments of the device according to the invention may comprise one or more of the following features:
- the device further comprises a first offset disposed downstream of the integrator in said first branch,
- the device further comprises a second offset disposed upstream of the second input in said second branch,
- the device further comprises an integral enabler disposed upstream of the integrator and arranged to receive a signal derived from said return pulse signal and to activate the integrator upon detecting a return pulse signal,
- the integral enabler is further arranged to add a reverse offset signal to the output of the integrator, said reverse offset signal being derived from one or more of the first offset, the second offset, and/or the comparator propagation delay,
- the device further comprises a delay line disposed upstream of both said first branch and said second branch,
- the device further comprises a splitter for driving the return pulse signal in said first branch and said second branch,
- the device further comprises an amplifier disposed in said second branch upstream of the second input of the comparator,
- said amplifier is disposed upstream of the second offset, and
- the device further comprises another amplifier disposed upstream of the integral enabler, the integrator and the second input of the comparator.

The invention also concerns a method for measuring a distance, comprising:
a) emitting a laser pulse toward a target,
b) generating a return pulse signal based on a laser pulse reflected by the target,
c) calculating an integral of a signal derived from the return pulse signal,
d) generating a return pulse time signal based on a comparison between said integral of a signal derived from the return pulse signal and a signal derived from the return pulse signal, said return pulse time signal being equal to a first fixed value when said integral of a signal derived from the return pulse signal exceeds said signal derived from the return pulse signal and equal to a second fixed value otherwise, and e) determining a target distance based on said return pulse time signal.

Various embodiments of the method according to the invention may comprise one or more of the following features:

operation c) comprises calculating an integral of a signal derived from the return pulse signal and applying a first offset to the resulting signal, operation d) comprises
  d1) applying a second offset to said return time signal,
  d2) generating a return pulse time signal based on a comparison between said integral of a signal derived from the return pulse signal and the signal of operation d1), operation c) further comprises
  c1) upon detecting the presence of a return pulse signal, calculating an integral of a signal derived from the return pulse signal,
  c2) applying a reverse offset to the signal of operation c1), said reverse offset being derived from one or more of the first offset and the second offset, and/or the comparator propagation delay, and
  c3) applying said first offset to the signal of operation c2), and said signal derived from the return pulse signal in operations c) and d) is obtained by amplifying said return pulse signal and/or by delaying the resulting signal.

BRIEF DESCRIPTION OF THE DRAWINGS

Other features and advantages of the invention will readily appear in the following specification, which describes examples taken from the drawings in a non-limiting manner. The drawings are intended to help better understand the invention by way of illustration, but may also be used to define it if necessary. On these drawings.

DETAILED DESCRIPTION

Figure 1:
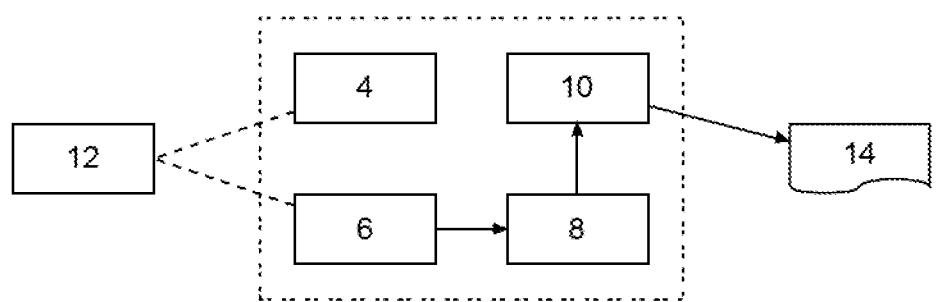
FIG. 1 shows a generic representation of an electronic distance meter according to the invention.

FIG. 1 shows a generic representation of an electronic distance meter (EDM) 2 according to the invention. EDM 2 comprises a light source 4, a photodetector 6, a comparison circuit 8 and a processor 10.

The EDM 2 may be a radar, laser rangefinder (a 3D scanner or a total station), a handheld laser distance meter, a LIDAR or any other laser based TOF distance measurement device. The light source 4 will be adapted according to the telemeter type. In the examples described below, the light source 4 is able to output light pulses having a width of the order of 1 ns, in order to be able to achieve millimeter precision. The photodetector 6 may also be chosen according to the type of EDM elected. In view of the light source 4 used, it will need a convenient bandwidth to manage nanosecond or sub nanosecond pulse width.

The comparison circuit 8 may be realized by any suitable architecture, such as a circuit board, an ASIC or an FPGA or any other means suitable for implementing its architecture and functions as described herein below.

The processor 10 may be any type of processing capable element adapted to perform the calculations and operations described herein. It may be a general-purpose microprocessor for personal computers, graphic cards or other electronic devices, a specialized chip such as a FPGA or a SoC (System on Chip), a computing source in a grid, a microcontroller, an ASIC or any other element capable of providing the computing power for those calculations and/or operations. One or more of the elements may be combined, including with part or whole of the comparison circuit 8.

According to the invention, the light source 4 emits a laser beam onto a target 12. Target 12 thereafter reflects a return pulse onto the photodetector 6. The output of photodetector 6 is fed to the comparison circuit 8, which outputs a trigger. The trigger is a step signal which transition brings the wanted time position information. The processor 10 receives the return pulse time signal and determines distance data 14 between the target 12 and the EDM 2.

Figure 2:
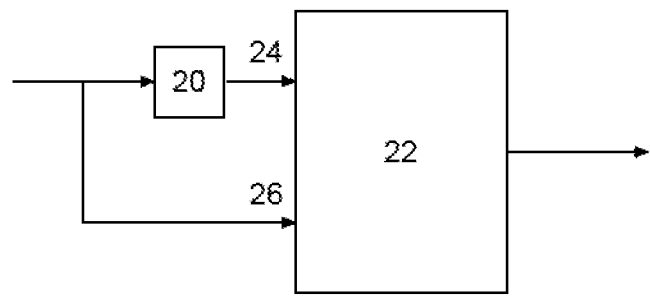
FIG. 2 shows a comparison circuit according to a first embodiment.

FIG. 2 represents the comparison circuit 8 according to a first embodiment of the invention.

In this embodiment, the comparison circuit 8 comprises an integrator 20 and a comparator 22.

The integrator 20 may be realized by any means available, be it a set of analog components, an ASIC, a programmed FPGA or any other suitable mean for producing the integral of the signal fed into integrator 20. To implement the integrator 20, a high slew rate, low noise, low offset, voltage-feedback amplifier is preferred to ensure integration stability and fast detection.

The comparator 22 comprises a first input 24 and a second input 26. The comparator 22 is such that its output toggles from a first fixed value signal when the signal at the first input 24 exceeds the signal at the second input 26 and else to a second fixed value signal. The comparator 22 is such that the trigger toggling transition is fast enough to preserve the wanted time position precision. In the example described herein, the first fixed value is "low", and the second fixed value is "high". In other embodiments, the first fixed value and the second fixed value may be set differently, as long as they allow the processor 10 to properly determine the time associated with the return pulse for TOF measurement. To achieve the best performances, an ultrafast voltage comparator having a bandwidth greater than 1 GHz fabricated in Silicon Germanium (SiGe) bipolar process can be used. It may feature either CML or ECL or PECL, LVPECL, RSPECL output drivers making them compatible with LVDS input drivers.

The return pulse signal is fed into the integrator 20, and the output of the integrator 20 is fed into the first input 24 of the comparator 22. The return pulse signal is also fed into the second input 26 of the comparator 22. The feeding in both branches can be done by means of a splitter not referenced on FIG. 2 and FIG. 4.

Figure 3:
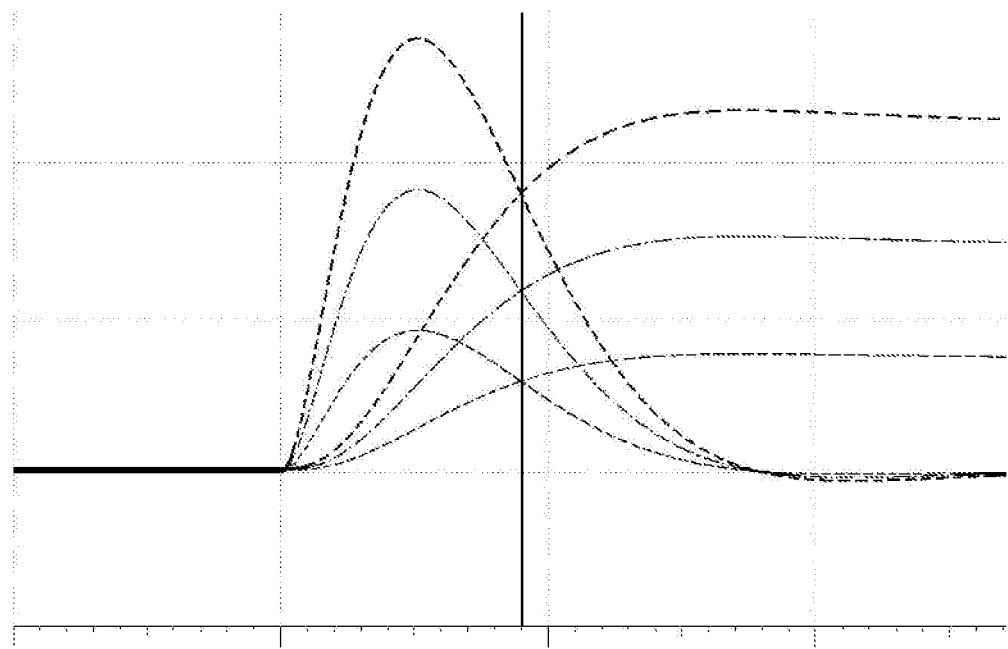
FIG. 3 shows a pulse having a fixed shape and varied levels, and the integrals of the same, and the fixed time position of the cross point between the signal and its integral for various signal levels.

FIG. 3 represents several pulse signals which have all the same shape, but different levels, as well as the integrals of these signals. This figure shows that, for a given pulse shape, the signal and its integral always cross each other at the same time point. The Applicant has discovered that this is extremely interesting in the case of the invention. Indeed, the shape of the return pulse will always be the same, as it is the same pulse which is output by the light source 4. However, depending on the reflection, the intensity of the return light pulse detected by the photodetector might vary.

By using the return pulse signal and the integral of the return pulse signal, the Applicant has discovered that it is possible to detect directly and extremely reliably the return pulse time position, with a precision which does not require feedback or threshold adaption, which makes this solution a real-time pulse detection.

Another advantage is that the return pulse signal and its integral intersect with opposite and very steep slopes, which further lowers the influence of amplitude noise on the cross-point time position measurement by the comparison circuit 8. More precisely, the angle between slopes is conventionally of the order of 60° for example, which induces an amplitude noise time jitter of about N divided by the square root of 6 where N is the amplitude noise. On the opposite, with a conventional threshold comparison, in order to make up for low reflections, the amplitude noise time jitter will be of the order of N times squared root of 3, which is 3 times squared root of 2 times more than the invention.

Other advantages include that the invention is suitable for any pulse width and a large range of shapes, the output of the comparator 22 is a binary step trigger thus suitable for digital interface as well as for TDC (Time to Digital Converter), time and luminance information are available simultaneously and are tightly correlated, part of high frequency noise is filtered by the integrator, output step time position is almost insensitive to the input level variations in the linear range of electronics part (because there is no saturation), the input noise has low impact on the comparator 22 output jitter (as shown above with respect to the high cross-point angle), the comparator 22 propagation delay is minimized, the distortion correction error is minimized, the comparator 22 output is insensitive to signal rebounds (since after the cross-point, the integral remains bigger than the return pulse signal rebounds or small oscillations), the comparator 22 output is insensitive to return pulse level variation, and the walk time due to pulse trailing edge or pulse width variations is limited.

Figure 4:
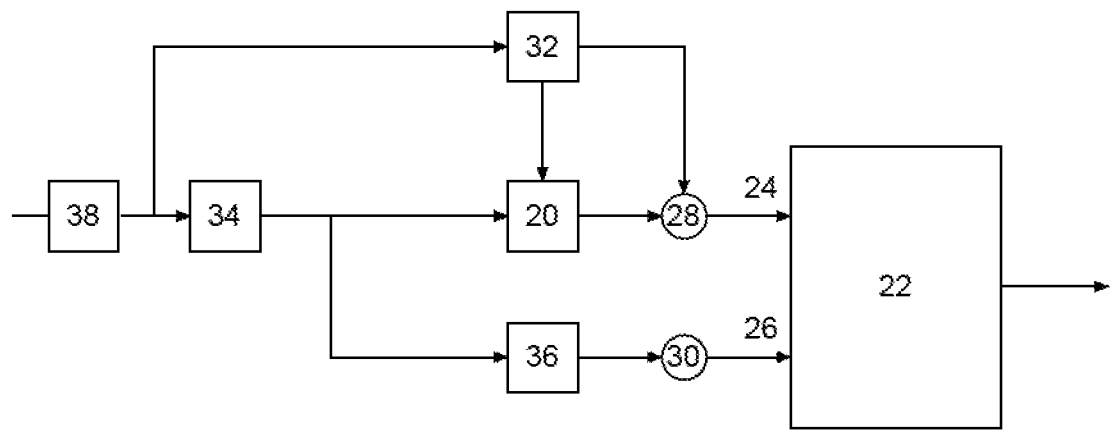
FIG. 4 shows a comparison circuit according to a second embodiment.

FIG. 4 represents the comparison circuit 8 according to a second embodiment of the invention. In this embodiment, the comparison circuit 8 has been completed in order to provide the best precision possible.

First of all, the comparison circuit 8 of FIG. 2 is so sensitive, that there is a risk that it may detect false positive return pulse times just because of background noise when there is no output from the photodetector 6. In order to prevent that issue, a first offset 28 and a second offset 30 are added to the respective signals before respectively the first input 24 and the second input 26 of the comparator 22. In an alternative embodiment, one of the first offset 28 and the second offset 30 can be omitted.

Of course, while the first offset 28 and the second offset 32 prevent background noise detection, they will tend to introduce a distortion of the cross-point time position determination for low level return signals (of the order of the offset value). In order to make up for that distortion, an integral enabler 32 is added before the integrator 20. The integral enabler 32 serves two purposes:
- detecting that a return pulse is starting, that is that the photodetector 6 is starting to output a signal, and in response, enabling the integrator 20 operation,
- introducing a reverse offset signal at the integrator 20 output to compensate for the offset distortion for low level signals as well as the comparator 22 propagation delay.

Indeed, in order for the integrator 20 to provide a stable signal profile, the integration has to be performed over a window closely fitting the return pulse signal, and the integral enabler 32 allows for that once a return pulse signal is detected. In an alternative embodiment, the integral enabler 32 may not provide a reverse offset signal and only provide for a windowed integration.

In order to allow the integral enabler 32 to operate appropriately, the return pulse signal is delayed both at the integrator 20 input and the second branch. This is done by a delay line 34 which delays the return pulse signal by the time it takes for the integral enabler 32 to detect a return pulse signal and activate the integrator 20.

In order to make up for any potential loss or gain of amplitude in the integrator 20 with respect to the return pulse signal branch, a current feedback amplifier 36 having a very wideband low noise may be used upstream of the offset 30 to scale properly the return pulse signal relatively to its integral obtained at integrator 20 output. Moreover, amplifier 36 can be used to introduce a derivative effect to further increase the cross-point slopes between the signal and its integral at comparator 22 input.

Finally, in order to further increase sensitivity of the EDM input, a current feedback amplifier 38 having a very wideband low noise may be used upstream of both the delay line 34 and the integral enabler 32.

The embodiment of FIG. 4 further ensures that the return pulse signal and its instantaneous integral are prepared to be compared simultaneously, the integral of the return pulse signal is a linear and proportional transformation of the return pulse signal, the comparison result is a "digital" step signal produced in real time during the return pulse signal, the integral of the return pulse signal brings time position information on its leading edge, the return pulse signal brings time position information on its trailing edge, and the integral of the return pulse signal brings luminance information.

As a result, the comparison circuit of the invention can be made quite inexpensive, all the while performing at a much higher performance level than existing solutions.

The invention claimed is:
1. Electronic distance meter comprising:
   a laser configured to emit a laser pulse toward a target,
   a photodetector configured to receive a laser pulse reflected by the target and output a corresponding return pulse signal, and
   a comparison circuit configured to receive said return pulse signal, the comparison circuit comprising a comparator provided with a first input and a second input and configured to output a first fixed value signal when the signal at the first input exceeds the signal at the second input and else to output a second fixed value signal, said comparison circuit configured to determine a return pulse time signal based on the output of said comparator, said electronic distance meter configured to determine a target distance based on said return pulse time signal, wherein said comparison circuit comprises a first branch connected to said first input and provided with an integrator which is configured to determine an integral of a first signal derived from said return pulse signal and provide the integral to an output coupled to said first input, and a second branch connected to said second input, the second branch configured to receive a second signal derived from said return pulse signal and provide the second signal without integration to the second input.
2. Electronic distance meter according to claim 1, further comprising a first voltage offset disposed downstream of the integrator in said first branch.

3. Electronic distance meter according to claim 1, further comprising a second voltage offset disposed upstream of the second input in said second branch.

4. Electronic distance meter according to claim 1, further comprising an integral enabler disposed upstream of the integrator and configured to receive a signal derived from said return pulse signal and configured to activate the integrator upon detecting a return pulse signal.

5. Electronic distance meter according to claim 4, wherein the integral enabler is further configured to add a reverse time offset signal to the output of the integrator, said reverse time offset signal being derived from one or more of a first voltage offset disposed downstream of the integrator in said first branch, a second voltage offset disposed upstream of the second input in said second branch, and/or the comparator propagation delay.

6. Electronic distance meter according to claim 4, further comprising a delay line disposed upstream of both said first branch and said second branch.

7. Electronic distance meter according to claim 1, further comprising a splitter configured to drive the return pulse signal in said first branch and said second branch.

8. Electronic distance meter according to claim 7, further comprising an amplifier disposed in said second branch upstream of the second input of the comparator.

9. Electronic distance meter according to claim 3, further comprising an amplifier disposed in said second branch upstream of the second input of the comparator, wherein said amplifier is disposed upstream of the second offset.

10. Electronic distance meter according to claim 8, further comprising another amplifier disposed upstream of the first branch and the second branch of the comparison circuit.

11. Method for measuring a distance, comprising:
    a) emitting a laser pulse toward a target,
    b) generating a return pulse signal based on a laser pulse reflected by the target,
    c) calculating an integral of a first signal derived from the return pulse signal,
    d) generating a return pulse time signal based on a comparison between said integral and a second signal derived from the return pulse signal without integration, said return pulse time signal being equal to a first fixed value when said integral exceeds said second signal and equal to a second fixed value otherwise, and
    e) determining a target distance based on said return pulse time signal.

12. Method according to claim 11, wherein operation c) comprises calculating the integral of the first signal derived from the return pulse signal and applying a first voltage offset to the resulting signal.

13. Method according to claim 11, wherein operation d) comprises
    d1) applying a second voltage offset to said return pulse signal,
    d2) generating a return pulse time signal based on a comparison between said integral of the first signal derived from the return pulse signal and the signal of operation d1).

14. Method according to claim 12, wherein operation c) further comprises
    c1) upon detecting the presence of the return pulse signal, calculating the integral of the first signal derived from the return pulse signal,
    c2) applying a reverse time offset to the signal of operation c1), said reverse time offset being derived from one or more of the first voltage offset and the second voltage offset, and/or the comparator propagation delay, and
    c3) applying said first voltage offset to the signal of operation c2).

15. Method according to claim 11, wherein said signal derived from the return pulse signal in operations c) and d) is obtained by amplifying said return pulse signal and/or by delaying the return pulse signal.

\* \* \* \* \*